US006842857B2

(12) United States Patent
Lee et al.

(10) Patent No.: US 6,842,857 B2
(45) Date of Patent: Jan. 11, 2005

(54) METHOD AND APPARATUS TO CONCURRENTLY BOOT MULTIPLE PROCESSORS IN A NON-UNIFORM-MEMORY-ACCESS MACHINE

(75) Inventors: Van Hoa Lee, Cedar Park, TX (US); Kiet Anh Tran, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 09/833,337

(22) Filed: Apr. 12, 2001

(65) Prior Publication Data

US 2002/0152371 A1 Oct. 17, 2002

(51) Int. Cl.[7] .................. G06F 9/00; G06F 15/177; G06F 15/167
(52) U.S. Cl. .............. 713/2; 713/1; 713/100; 709/200; 709/201; 709/213; 709/214; 709/215; 709/216
(58) Field of Search ................ 713/1, 2, 100; 709/200, 201, 203, 208, 209, 210, 211, 212, 213, 214, 215, 216

(56) References Cited

U.S. PATENT DOCUMENTS

| 5,802,378 | A | * | 9/1998 | Arndt et al. ............... 710/267 |
| 5,867,702 | A | | 2/1999 | Lee ............................ 395/651 |
| 5,938,765 | A | * | 8/1999 | Dove et al. ................... 713/1 |
| 5,970,439 | A | * | 10/1999 | Levine et al. ............... 702/186 |
| 6,158,000 | A | | 12/2000 | Collins ......................... 713/1 |
| 6,178,445 | B1 | | 1/2001 | Dawkins et al. ............ 709/209 |
| 6,182,106 | B1 | | 1/2001 | Casey et al. ................ 709/100 |
| 6,351,795 | B1 | * | 2/2002 | Hagersten .................. 711/202 |
| 6,584,560 | B1 | * | 6/2003 | Kroun et al. ................. 713/2 |
| 6,611,911 | B1 | * | 8/2003 | O'Shea et al. ................ 713/1 |
| 6,678,741 | B1 | * | 1/2004 | Northcutt et al. .......... 709/248 |

OTHER PUBLICATIONS

IBM Research Disclosure, vol. 416, Issue 99, "Start–Up Methodology for a NUMA Machine", Dec. 1998, pp. 1674–1675.

* cited by examiner

*Primary Examiner*—Rehana Perveen
*Assistant Examiner*—James K. Trujillo
(74) *Attorney, Agent, or Firm*—Duke W. Yee; Mark E. McBurney; Lisa L. B. Yociss

(57) ABSTRACT

A method, apparatus and program for booting a non-uniform-memory-access (NUMA) machine are provided. The invention comprises configuring a plurality of standalone, symmetrical multiprocessing (SMP) systems to operate within a NUMA system. A master processor is selected within each SMP; the other processors in the SMP are designated as NUMA slave processors. A NUMA master processor is then chosen from the SMP master processors; the other SMP master processors are designated as NUMA slave processors. A unique NUMA ID is assigned to each SMP that will be part of the NUMA system. The SMPs are then booted in NUMA mode in one-pass with memory coherency established right at the beginning of the execution of the system firmware.

16 Claims, 3 Drawing Sheets

METHOD AND APPARATUS TO CONCURRENTLY BOOT MULTIPLE PROCESSORS IN A NON-UNIFORM-MEMORY-ACCESS MACHINE

BACKGROUND OF THE INVENTION

1. Technical Field

The present invention relates to multiprocessor computer architectures and more specifically to Non-Uniform-Memory-Access (NUMA) machines.

2. Description of Related Art

A Symmetric Multiprocessing (SMP) architecture contains multiple Central Processing Units (CPUs) that reside in one cabinet and share the same memory. This architecture allows SMP systems to provide scalability, depending on the user's needs, such as transaction volume.

SMP systems can contain from two to 32 or more CPUs. However, if one CPU within a SMP system fails, the entire system fails. To guard against CPU failure, redundancy can be provided using two or more SMP systems in a cluster. In this way, if one SMP system in the cluster fails, the others can continue to operate and compensate for the lost system.

A single CPU usually boots the SMP system and loads the operating system, which brings the other CPUs online. Because the CPUs in a SMP system share the same memory, there is only one operating system and one instance of the application in memory. SMP systems are particularly advantageous whenever processes can be overlapped. For example, multiple applications may be run simultaneously. Another example is multithreading, which comprises concurrent operations within a single application.

Non-Uniform Memory Access (NUMA) architecture is a multiprocessing architecture in which memory is separated into close and distant banks. Like SMP, a NUMA machine comprises multiple CPUs sharing a single memory. However, in NUMA, local memory located on the same processing board as the CPUs is accessed faster than shared memory located on other processing boards.

A SMP system memory map architecture can be structured to support a NUMA machine with individual SMP systems connected with the SMA NUMA adapters. When each SMP system is a standalone machine, the system node ID field in the PIR register of each Giga-Processor (GP) is always set to 0. The firmware always uses the memory map corresponding to the system ID0 to perform Remote Input/Output (RIO) configuration.

When several SMP systems are connected to form a NUMA machine, the individual SMP systems will have to be set up properly with respect to the NUMA memory map for them to function correctly in the NUMA machine. While maintaining the firmware function to boot the SMP system in standalone mode, it is desirable that the same system firmware image can provide a method to configure the entire NUMA machine in order to boot all individual SMP machines for normal operation in NUMA mode.

In addition, it is also desirable that this new method will manage to boot the NUMA machine without incurring significant boot time spent on performing RIO configurations, i.e. concurrently performing RIO configurations of each system node.

SUMMARY OF THE INVENTION

The present invention provides a method, apparatus and program for booting a non-uniform-memory-access (NUMA) machine. The invention comprises configuring a plurality of standalone, symmetrical multiprocessing (SMP) systems to operate within a NUMA system. A master processor is selected within each SMP; the other processors in the SMP are designated as NUMA slave processors. A NUMA master processor is then chosen from the SMP master processors; the other SMP master processors are designated as NUMA slave processors. A unique NUMA ID is assigned to each SMP that will be part of the NUMA system. The SMPs are then booted in NUMA mode in one-pass with memory coherency established right at the beginning of the execution of the system firmware.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
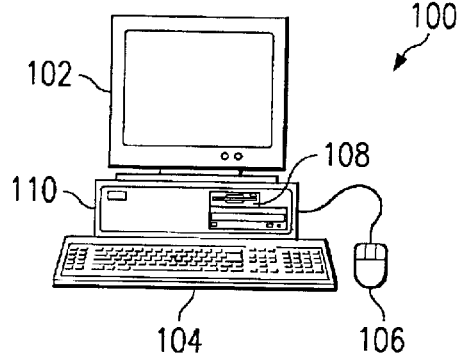
FIG. 1 depicts a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 also preferably includes a graphical user interface that may be implemented by means of systems software residing in computer readable media in operation within computer 100.

Figure 2:
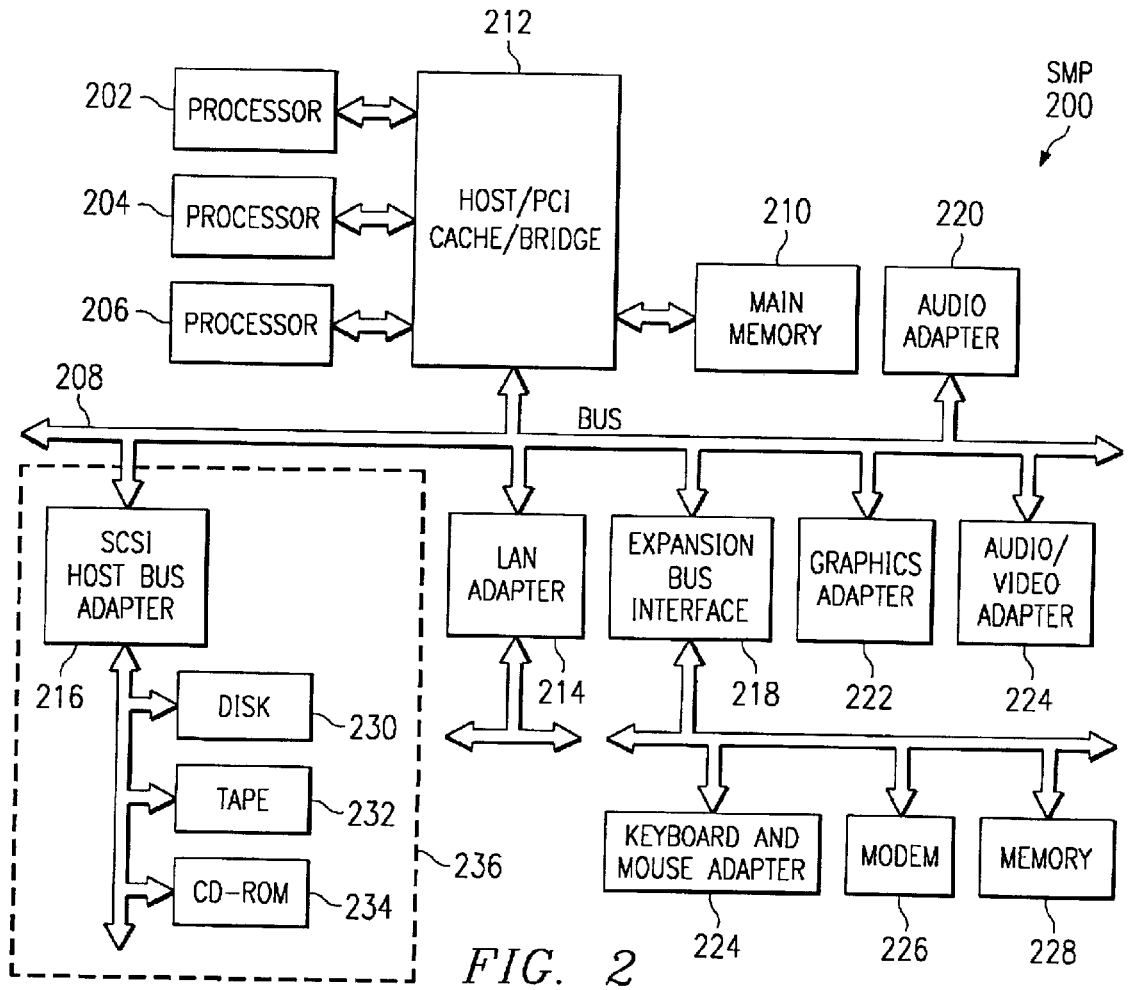
FIG. 2 depicts a block diagram of a data processing system is shown in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processors 202, 204, 206 and main memory 210 are connected to PCI local bus 208 through PCI bridge 212. PCI bridge 212 also may include an integrated memory controller and cache memory for processors 202, 204, and 206. Additional connections to PCI local bus 208 may be made through direct component interconnection or through add-in boards. In the depicted example, local area network (LAN) adapter 214, small computer system interface SCSI host bus adapter 216, and expansion bus interface 218 are connected to PCI local bus 208 by direct component connection. In contrast, audio adapter 220, graphics adapter 222, and audio/video adapter 224 are connected to PCI local bus 208 by add-in boards inserted into expansion slots. Expansion bus interface 218 provides a connection for a keyboard and mouse adapter 224, modem 226, and additional memory 228. SCSI host bus adapter 216 provides a connection for hard disk drive 230, tape drive 232, and CD-ROM drive 234. Typical PCI local bus implementations will support three or four PCI expansion slots or add-in connectors.

A single operating system runs on processors 202, 204, and 206 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 230, and may be loaded into main memory 210 for execution by processors 202, 204 and 206.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

The depicted example in FIG. 2 and above-described examples are not meant to imply architectural limitations.

A Symmetric Multiprocessing (SMP) system memory map is structured to support a Non-Uniform-Memory-Access (NUMA) configuration by connecting individual SMP machines. When individual machines are used in stand alone mode, the system ID in the processor is set to zero. The present invention uses the same firmware to configure the system in SMP and NUMA mode. The HSC for the NUMA system will instruct each SMP system's service processor to set up the system in NUMA mode based on the NUMA configuration setup variables stored in each SMP system's Non-Volatile Random Access Memory (NVARM).

The NUMA machine has one or more Hardware System Consoles (HSC) to manage and configure the NUMA machine. Each SMP system has its own built-in Common Service Processor (CSP). The HSC connects to all CSPs in some communication links.

Figure 3:
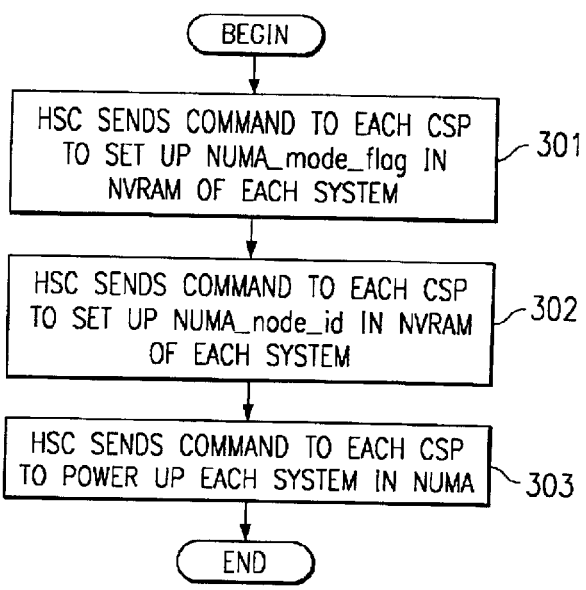
FIG. 3 depicts a flowchart illustrating the process of SMP system configuration in accordance with the present invention.

Referring to FIG. 3, a flowchart illustrating the process of SMP system configuration is depicted in accordance with the present invention. In this stage of the startup process, the HSC communicates with the SMPs and assigns each SMP an ID which designates the SMP's place within the NUMA machine. Each CSP of the system maintains two Non-Volitile Random Access Memory (NVRAM) byte-variables for NUMA configuration setup:

NUMA_mode_flag: If NUMA_mode_flag=0, the system is in standalone SMP mode. Otherwise, the mode, and the value of the variable, is a bitmask to indicate the presence of the system nodes within the NUMA machine.

NUMA_node_id: This contains the system node ID for the SMP system where this NVRAM variable exists.

The HSC instructs all CSPs to set up the NUMA_mode_flag with the proper mask value for the NUMA machine (step 301), and then assigns and instructs each CSP to set up its unique NUMA_node_id (step 302). After the NUMA_mode_flag and NUMA_node_id are set, the HSC sends a power-on command to each node's CSP to power on its attached SMP system (step 303).

Figure 4:
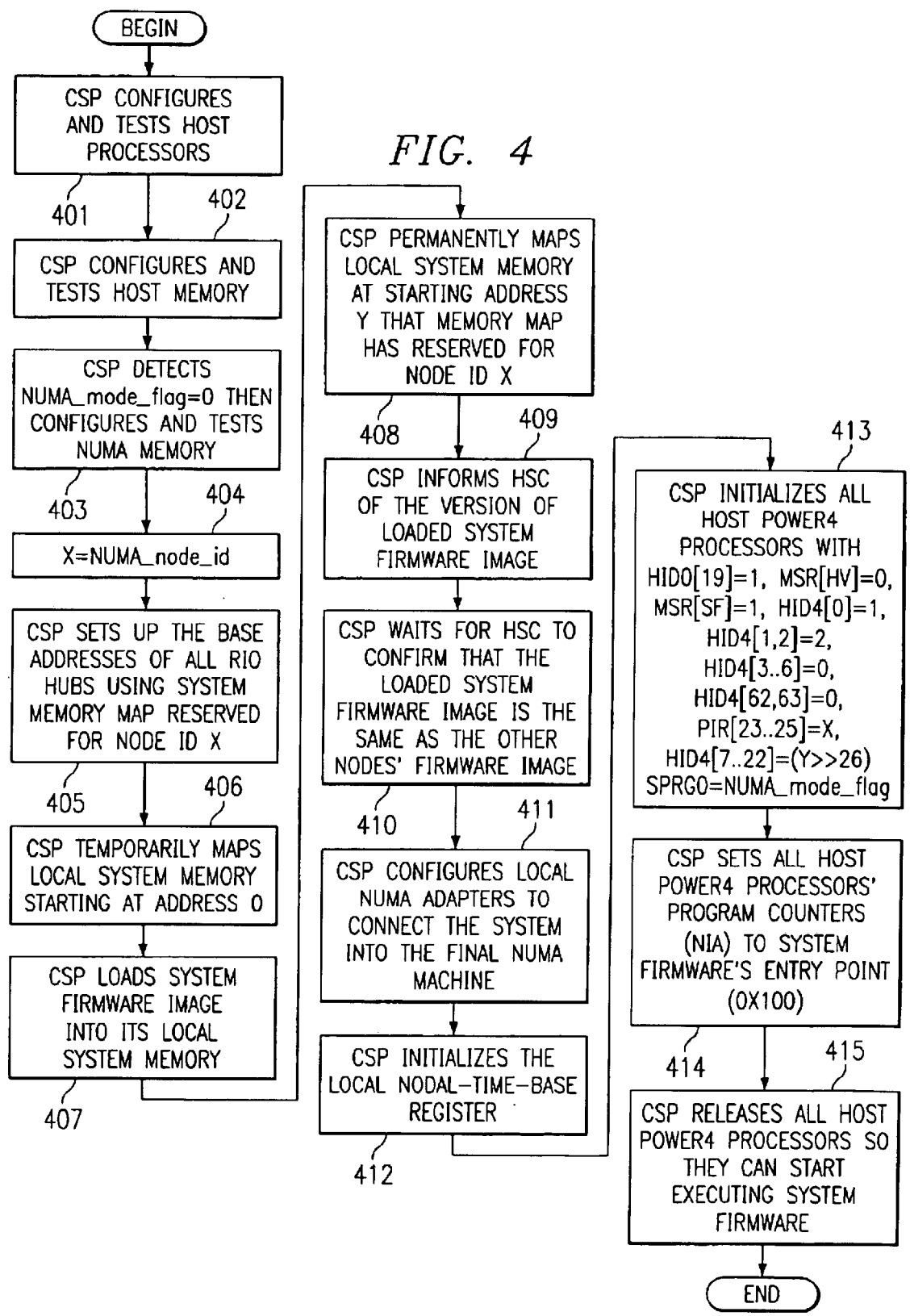
FIG. 4 depicts a flowchart illustrating the process of configuring the host processor and memory in accordance with the present invention.

Referring to FIG. 4, a flowchart illustrating the process of configuring the host processor and memory is depicted in accordance with the present invention. Each node's CSP configures and tests the host processors (step 401), and then configures and tests the host memory (step 402). After Power On Self Test (POST), the memory will be assigned a system memory base address, but can be non-contiguous. For example, the memory of a SMP system can be non-contiguous with numeral memory regions, but cannot go beyond its 256 G size.

After the host processors and memory are configured and tested, the CSP configures and tests the NUMA memory (step 403) and sets the node ID to X (step 404). The CSP then sets up the base addresses for all Remote Input/Output (RIO) hubs by using a system memory map reserved for node ID X (step 405).

Then CSP temporarily maps local system memory starting at the address zero (step 406), and then loads the system firmware image into its local system memory (407). From there, the CSP permanently maps the local system memory at the starting address Y that the memory map has reserved for node ID X (step 408). Once the local system memory has been mapped, the CSP informs the HSC of the version of loaded firmware image (step 409) and then waits for the HSC to confirm that the loaded system firmware image is the same as the other node's firmware image (step 410).

The CSP configures its NUMA adapters to connect the system into the final NUMA machine (step 411), and initializes the local nodal-time-base register (step 412).

Making use of the logical partition hardware of the Giga-processor, each node's CSP starts all GP processors with:

MSR[SF]=1, which tells the processor to start executing code in 64-bit mode.

MSR[HV]=0, which places the processor in a logical partition environment.

HID0[19]=1, which indicates that the timebase function of the processor is operating in NUMA mode. It also serves as a NUMA firmware flag, so that the firmware must follow the NUMA execution path.

HID4[0]=1, which selects the processor running in the RS/6000 server machine's environment.

HID4[7:22]=System memory base address (Y) scaled by 64M=NUMA_node_id*256G.

HID4[1.2]=2. Set this register (real mode limit register) to encode 1 G real mode address-size enabling.

HID4[62:63 || 3:6]=0, which sets the logical partition ID to 0, the default value.

PIR[23,25]=NUMA_node_id. Set this register to the node_id of the SMP system where the processor resides.

SPRGO=NUMA_mode_flag. This sets the system firmware to execute at its entry point.

Step (413).

The CSP sets all host processors' program counters to the system firmware's entry point (step 414), and releases all host processors so that they can start executing the system firmware (step 415). The above setups allow the system firmware images at individual nodes to run as if it is loaded at memory address 0.

Figure 5:
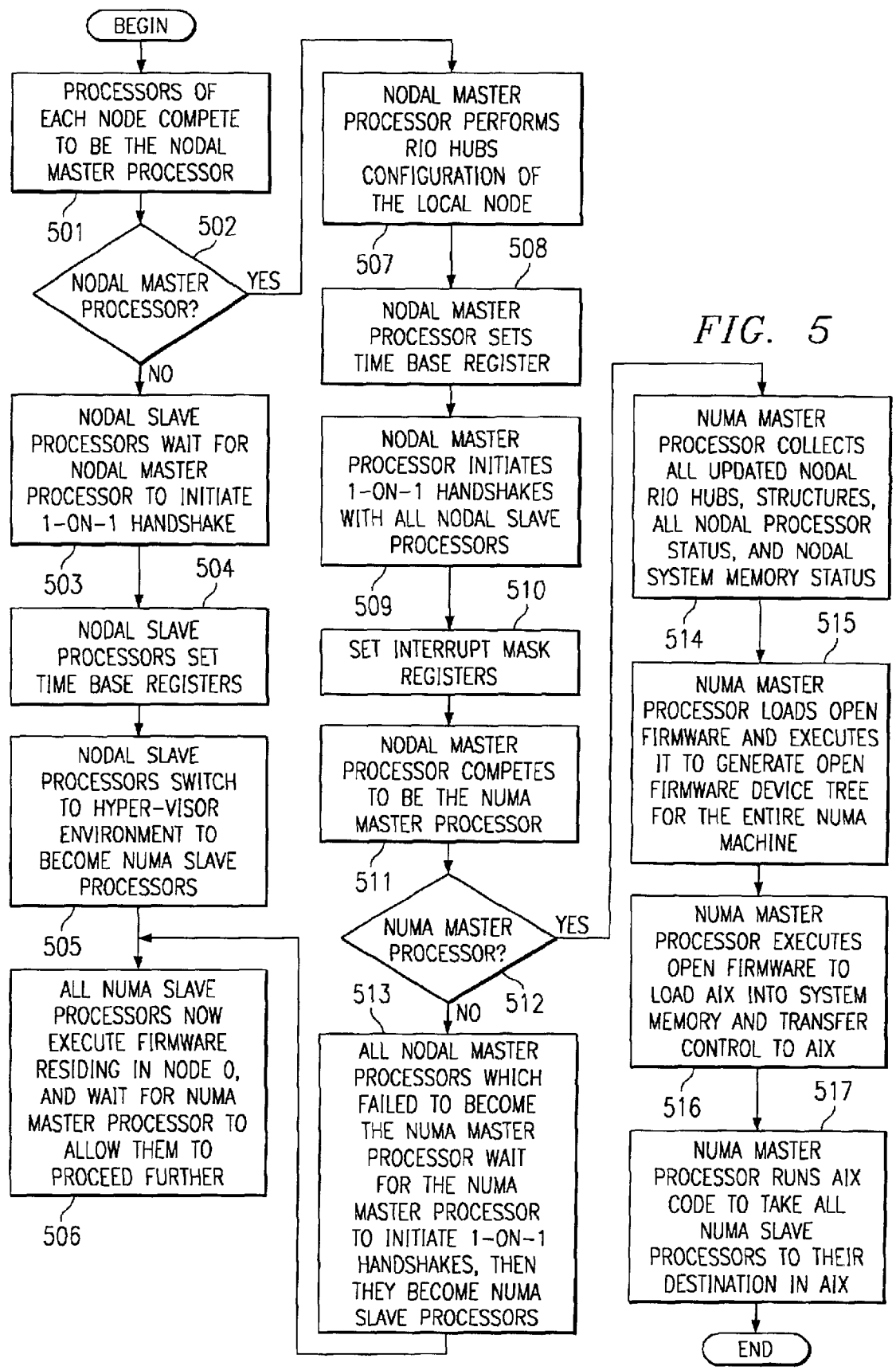
FIG. 5 depicts a flowchart illustrating the process of booting a NUMA system in accordance with the present invention.

Referring now to FIG. 5, a flowchart illustrating the process of booting a NUMA system is depicted in accordance with the present invention. The process begins when each node selects a master processor which will configure the node's RIO (step 501). Each system node's firmware has implemented a master software semaphore. All processors from the same system node will compete to obtain this semaphore. The winner successfully obtaining the semaphore becomes the nodal master processor. The processors that do not become the master nodal processor are referred to as slave processors. The nodal slave processors wait for the nodal master processor to initiate one-on-one handshakes (step 503), at which time the slave processors set their timebase (TB) registers (step 504). The slave processors then switch to a hyper-visor environment to become NUMA slave processors (step 505). Hyper-visor environment is an executing environment wherein the processors have unrestricted access to the system's hardware. All NUMA slave processors then execute firmware residing in node 0, and wait for the NUMA master processor to allow them to proceed further (step 506).

The nodal processor that is selected to be the nodal master processor must configure the RIO hubs of the local node (step 507). After finishing RIO configuration, the nodal master processor synchronizes its TB register with the nodal TB (step 508) and then handshakes with each nodal slave processor so that each slave processor will also synchronize its TB register (step 509). After the handshake, the nodal slave processors leave the partition environment and go to hyper-visor environment, as described in step 505. The slave processors continue executing the same code which will now be fetched from the memory of the system node ID0. These nodal slave processors will now be the NUMA slave processors of the NUMA machine, and wait for the NUMA master processor to initiate one-on-one handshakes. Each nodal master processor then sets up the node's Global Queue Interrupt Mask (GQIRM) registers (step 510).

Each nodal master processor leaves the partition environment and goes to global hyper-visor environment and hyper-visor memory area to compete to be the NUMA master processor (step 511). The system firmware also implements the NUMA master software semaphore. Since all nodal master processors all switch to the hyper-visor environment, the NUMA master software semaphore of the firmware for the system node ID0 is the competition target. Again, the winner successfully obtaining this NUMA master semaphore becomes the NUMA master processor. If a nodal master processor fails to be the NUMA master processor, it will wait for one-on-one handshaking with the NUMA master processor and then become a NUMA slave processor (step 513).

The processor selected as the NUMA master processor gathers all updated nodal RIO structures, all nodal memory status, and all nodal processor status (step 514). The NUMA master processor then executes open firmware and creates the open firmware device tree for the entire NUMA machine (step 515). The NUMA master processor goes on to boot the NUMA machine as if it is logically a giant SMP machine. This comprises loading the operating system (OS) into NUMA system memory and transferring control to the OS (step 516). The NUMA master processor runs the OS code to take all of the NUMA slave processors to their destination in the OS (step 517).

The method of the present invention establishes the memory coherency among SMP system nodes before the execution of the System firmware. This allows the NUMA machine to be started with coherent system memory, thus avoiding the non-coherence of the traditional two-pass method of the prior art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for booting a non-uniform-memory-access (NUMA) machine, comprising:

prior to beginning booting of any of a plurality of standalone, symmetrical multiprocessing (SMP) systems, configuring each of said plurality of standalone, symmetrical multiprocessing systems to operate within a NUMA system;

prior to beginning booting of any of said plurality of SMP systems, assigning a NUMA identification to each of the multiprocessing systems, wherein each identification is unique; and concurrently booting all of the multiprocessing systems together in NUMA mode in one-pass, memory coherency being established prior to the execution, by any of said plurality of SMP systems, of system firmware.

2. The method according to claim 1, wherein the step of configuring the multiprocessing systems further comprises:

configuring and testing host processors and memory;

configuring and testing NUMA memory;

loading firmware image into local memory and informing a hardware system console of the firmware version;

receiving a confirmation from the hardware system console that the firmware version is the same for all multiprocessing systems in the NUMA system;

configuring NUMA adapters to connect each multiprocessing system to the NUMA system and initializing all host processors; and releasing all host processors to execute system firmware.

3. The method according to claim 1, further comprising:

prior to beginning booting of any of said plurality of SMP systems, all of a plurality of processors within each one of said SMP systems competing with each other to become a nodal master processor;

prior to beginning booting of any of said plurality of SMP systems, designating one of said plurality of processors within each one of said SMP systems competing that won said competition as said nodal master processor and designating all remaining ones of said plurality of processors within each one of said SMP systems as slave processors;

prior to beginning booting of any of said plurality of SMP systems, each one of said nodal master processors competing with each other to become a NUMA master processor;

prior to beginning booting of any of said plurality of SMP systems, designating one of said nodal master processors that won said competition as said NUMA master processor and designating all remaining nodal master processors as slave NUMA processor; and concurrently booting all of the SMP systems together in NUMA mode in one-pass utilizing said NUMA master processor.

4. The method according to claim 3, further comprising:

performing one-to-one handshaking between the nodal master processor and each nodal slave processor within a multiprocessing system, wherein the handshaking synchronizes the time base register of all nodal slave processors with a nodal time base source; and switching the nodal slave processors in each multiprocessing system to a hyper-visor environment in which the nodal slave processors become NUMA slave processors.

5. The method according to claim 3, wherein the NUMA master processor:

loads a single operating system into NUMA system memory;

transfers control to the operating system; and runs operating system code which assigns all slave processors to a designated place within the NUMA operating system.

6. A system for booting a non-uniform-memory-access (NUMA) machine, comprising:

a plurality of hardware-configuring components which, prior to beginning booting of any of a plurality of standalone, symmetrical multiprocessing (SMP) systems, configure each one of said plurality of standalone, symmetrical multiprocessing (SMP) systems to operate within a NUMA system;

an identification component which, prior to beginning booting of any of said plurality of SMP systems, assigns a NUMA identification to each of the multiprocessing systems, wherein each identification is unique; and a booting mechanism which concurrently boots all of the multiprocessing systems together in NUMA mode in one-pass, memory coherency being established prior to the execution, by any of said plurality of SMP systems, of system firmware.

7. The system according to claim 6, wherein each hardware-configuring component further comprises:

a host testing component which configures and tests host processors and memory;

a NUMA testing component which configures and tests NUMA memory;

a software loading mechanism which loads a firmware image into local memory and informs a hardware system console of the firmware version;

a receiving component which receives a confirmation from the hardware system console that the firmware version is the same for all multiprocessing systems in the NUMA system;

an adapter-configuring component which configures NUMA adapters to connect each multiprocessing system to the NUMA system and initializing all host processors; and a releasing mechanism which releases all host processors to execute system firmware.

8. The system according to claim 6, further comprising:

all of a plurality of processors within each one of said SMP systems competing with each other, prior to beginning booting of any of said plurality of SMP systems, to become a nodal master processor;

one of said plurality of processors within each one of said SMP systems that won said competition being designated as said nodal master processor and all remaining ones of said plurality of processors within each of said SMP systems being designated as slave processors prior to beginning booting of any of said SMP systems;

each one of said nodal master processors competing with each other, prior to beginning booting of any of said plurality of SMP systems, to become a NUMA master processor;

one of said master processors that won said competition being designated as said NUMA master processor and all remaining nodal master processors being designated as slave NUMA processors prior to beginning booting of any of said plurality of SMP systems; and all of the SMP systems being concurrently booted together on NUMA mode in one-pass utilizing said NUMA master processor.

9. The system according to claim 8, further comprising:

a handshaking mechanism which performs one-to-one handshaking between the nodal master processor and each nodal slave processor within a multiprocessing system, wherein the handshaking synchronizes the time base register of all nodal slave processors with a nodal time base source; and a switching mechanism which switches the nodal slave processors in each multiprocessing system to a hyper-visor environment in which the nodal slave processors become NUMA slave processors.

10. The system according to claim 8, wherein the NUMA master processor:

loads a single operating system into NUMA system memory;

transfers control to the operating system; and runs operating system code which assigns all slave processors to a designated place within the NUMA operating system.

11. A computer program product in a computer readable medium for use in a data processing system, for booting a non-uniform-memory-access (NUMA) machine, the computer program product comprising:

instructions for, prior to beginning booting of any of a plurality of standalone, symmetrical multiprocessing (SMP) systems, configuring each one of said plurality of standalone, symmetrical multiprocessing systems to operate within a NUMA system;

instructions for, prior to beginning booting of any said plurality of (SMP) systems, assigning a NUMA identification to each of the multiprocessing systems, wherein each identification is unique; and instructions for concurrently booting all of the multiprocessing systems together in NUMA mode in one-pass, memory coherency being established the execution, by any of said plurality of SMP systems, of system firmware.

12. The computer program product according to claim 11, wherein the step of configuring the multiprocessing systems further comprises:

instructions for configuring and testing host processors and memory;

instructions for configuring and testing NUMA memory;

instructions for loading firmware image into local memory and informing a hardware system console of the firmware version;

instructions for receiving a confirmation from the hardware system console that the firmware version is the same for all multiprocessing systems in the NUMA system;

instructions for configuring NUMA adapters to connect each multiprocessing system to the NUMA system and initializing all host processors; and instructions for releasing all host processors to execute system firmware.

13. The computer program product according to claim 11, further comprising:

prior to beginning booting of any of said plurality of SMP systems, all of a plurality of processors within each one of said SMP systems competing with each other to become a nodal master processor;

instructions for designating, prior to beginning booting of any of said plurality of SMP systems, one of said plurality of processors within each one of said SMP systems that won said competition as said nodal master processor and designating all remaining ones of said plurality of processors within each one of said SMP systems as slave processors;

prior to beginning booting of any of said plurality of SMP systems, each one of said nodal master processors competing with each other to become a NUMA master processor;

instructions for designating, prior to beginning booting of any of said plurality of SMP systems, one of said nodal master processors that won said competition as said NUMA master processor and designating all remaining nodal master processors as slave NUMA processor; and instructions for concurrently booting all of the SMP systems together in NUMA mode in one-pass utilizing said NUMA master processor.

14. The computer program product according to claim 13, further comprising:

instructions for performing one-to-one handshaking between the nodal master processor and each nodal slave processor within a multiprocessing system, wherein the handshaking synchronizes the time base register of all nodal slave processors with a nodal time base source; and instructions for switching the nodal slave processors in each multiprocessing system to a hyper-visor environment in which the nodal slave processors become NUMA slave processors.

15. The computer program product according to claim 13, wherein the NUMA master processor:

loads a single operating system into NUMA system memory;

transfers control to the operating system; and runs operating system code which assigns all slave processors to a designated place within the NUMA operating system.

16. A system for booting a non-uniform-memory-access (NUMA) machine, comprising:

a plurality of hardware-configuring components which, prior to beginning booting of any of a plurality of standalone, symmetrical multiprocessing (SMP) systems, configure each one of said plurality of SMP systems to operate within a NUMA system;

an identification component which, prior to beginning booting of any of said plurality of SMP systems, assigns a NUMA identification to each of the multiprocessing systems, wherein each identification is unique;

a booting mechanism which concurrently boots all of the multiprocessing systems together in NUMA mode in one-pass, memory coherency being established prior to the execution, by any of said plurality of SMP systems, of system firmware;

all of a plurality of processors within each one of said SMP systems competing with each other, prior to beginning booting of any of said plurality of SMP systems, to become a nodal master processor;

prior to beginning booting of any of said plurality of SMP systems, one of said plurality of processors within each one of said SMP systems winning said competition by acquiring a nodal semaphore, wherein only one processor can acquire and hold said nodal semaphore at a time;

said one of said plurality of processors that acquired said nodal semaphore being designated, prior to beginning booting of any of said plurality of SMP systems, as said nodal master processor and all remaining ones of said plurality of processors within each one of said systems being designated as slave processors;

each one of said nodal master processors competing with each other, prior to beginning booting of any of said plurality of SMP systems, to become a NUMA master processor;

prior to beginning booting of any of said plurality of SMP systems, one of said nodal master processors winning said competition by acquiring a NUMA semaphore, wherein only one processor can acquire and hold said NUMA semaphore at a time;

said one of said nodal master processors that acquired said NUMA semaphore being designated, prior to beginning booting of any of said plurality of SMP systems, as said NUMA master processor and all remaining nodal master processors being designated as slave NUMA processors; and all of the SMP systems being concurrently booted together on NUMA mode in one-pass utilizing said NUMA master processor.

* * * * *

UNITED STATES PATENT AND TRADEMARK OFFICE
CERTIFICATE OF CORRECTION

PATENT NO. : 6,842,857 B2
DATED : January 11, 2005
INVENTOR(S) : Lee et al.

It is certified that error appears in the above-identified patent and that said Letters Patent is hereby corrected as shown below:

Column 4,
Line 61, before "Set this" delete "HID4[1.2]=2" and insert -- HID4[1:2]=2 --.

Column 6,
Line 45, after "each" insert -- one --.

Column 8,
Line 24, after "each" insert -- one --.
Line 31, after "one of said" insert -- nodal --.
Line 37, after "together" delete "on" and insert -- in --.

Column 9,
Line 3, after "booting" delete "of any said" and insert -- of any of said --.

Column 10,
Line 60, after "together" delete "on" and insert -- in --.

Signed and Sealed this

Eighteenth Day of April, 2006

JON W. DUDAS
*Director of the United States Patent and Trademark Office*